United States Patent
Musuluri

(10) Patent No.: US 10,949,437 B2
(45) Date of Patent: Mar. 16, 2021

(54) SYSTEM AND METHOD FOR VARIABLE PRESENTATION SEMANTICS OF SEARCH RESULTS IN A SEARCH ENVIRONMENT

(71) Applicant: Aravind Musuluri, Johns Creek, GA (US)

(72) Inventor: Aravind Musuluri, Johns Creek, GA (US)

( * ) Notice: Subject to any disclaimer, the term of this patent is extended or adjusted under 35 U.S.C. 154(b) by 332 days.

(21) Appl. No.: 14/691,312

(22) Filed: Apr. 20, 2015

(65) Prior Publication Data

US 2016/0019269 A1  Jan. 21, 2016

Related U.S. Application Data

(60) Provisional application No. 61/981,815, filed on Apr. 20, 2014.

(51) Int. Cl.
*G06F 16/248* (2019.01)
*G06F 16/951* (2019.01)
*G06F 16/338* (2019.01)

(52) U.S. Cl.
CPC .......... *G06F 16/248* (2019.01); *G06F 16/338* (2019.01); *G06F 16/951* (2019.01)

(58) Field of Classification Search
CPC ..................... G06F 17/30554; G06F 17/30864
USPC ......................................................... 707/722
See application file for complete search history.

(56) References Cited

U.S. PATENT DOCUMENTS

| | | | | |
|---|---|---|---|---|
| 8,073,830 B2* | 12/2011 | Fontes | ................... | G06F 16/951 707/706 |
| 8,255,381 B2* | 8/2012 | Fontes | ................... | G06F 16/951 707/706 |
| 8,527,491 B2* | 9/2013 | Fontes | ................... | G06F 16/951 707/706 |
| 2005/0028077 A1* | 2/2005 | Wen | ....................... | G06F 17/218 715/272 |
| 2005/0154723 A1 | 7/2005 | Liang | | |
| 2007/0239662 A1* | 10/2007 | Fontes | ................... | G06F 16/951 |
| 2008/0139191 A1 | 6/2008 | Melnyk et al. | | |
| 2012/0042231 A1* | 2/2012 | Fontes | ................... | G06F 16/951 715/205 |
| 2012/0323895 A1* | 12/2012 | Fontes | ................... | G06F 16/951 707/722 |
| 2013/0097482 A1* | 4/2013 | Marantz | .............. | G06F 16/9577 715/234 |
| 2013/0346396 A1* | 12/2013 | Stamm | .............. | G06F 17/30867 707/722 |
| 2015/0074518 A1* | 3/2015 | Rumsey | .............. | G06F 17/3089 715/235 |
| 2015/0310100 A1* | 10/2015 | Bursey | .............. | G06F 17/30864 707/706 |

* cited by examiner

*Primary Examiner* — Sheree N Brown

(57) ABSTRACT

System and method for display of search results with variable presentation semantics in a search environment are disclosed. The method includes displaying search results of a search operation, the display comprising extracts of at least two search results such that the two search results have different presentation semantics from each other and wherein the presentation semantics of at least one portion of at least one of the search result is altered with respect to the default presentation semantics.

4 Claims, 4 Drawing Sheets

SYSTEM AND METHOD FOR VARIABLE PRESENTATION SEMANTICS OF SEARCH RESULTS IN A SEARCH ENVIRONMENT

CROSS REFERENCE TO RELATED APPLICATION

This application claims priority to U.S. Provisional Application Ser. No. 61/981,815 entitled "System and Method For Variable Presentation Semantics Of Search Results In A Search Environment" filed on Apr. 20, 2014, which is incorporated herein by reference.

TECHNICAL FIELD

The present disclosure generally relates to search engine operations and method to display the results of a search operation. Particularly, the disclosure relates to improving user experience in viewing the search results and more particularly to a system and method for displaying search results with variable presentation semantics.

BACKGROUND

The statements in this section merely provide background information related to the present disclosure and may not constitute prior art.

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query.

While the popularity of search engines may rely on various factors; relevancy of the search results and the manner in which they are displayed play an important role in enhancing a user experience. Known search engines like Google®, Bing®, Yahoo® etc. typically display a search result page comprising multiple search results with similar presentation semantics. This is a disadvantage since search results differ from each other in type and/or size. One example of such disadvantage is a search result display comprising extracts in the form of a table with multiple columns. The search engines display the table extract in textual format and in same presentation semantics of the other search results. This may lead to sub optimal display of the search results.

Systems for searching the Intranets, Extranets, Local Area Networks, individual computers and even single documents also generally suffer from these same drawbacks.

In view of the above drawbacks, there remains a need to improve the process of presenting search results.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to the aspects illustrated herein, the present disclosure relates to a method to display the results of a search operation on at least one data source, the display comprising extracts of at least two search results such that the two search results have different presentation semantics from each other and wherein the presentation semantics of at least one portion of at least one of the search result is altered with respect to the default presentation semantics.

In one embodiment of the current aspect, the method of altering the presentation semantics of the search results comprises (a) determining the area allocated to display the search results (b) altering the presentation semantics based on the allocated area.

The presentation semantics herein are selected from the group comprising font size, font type and combinations thereof.

In another aspect of the present disclosure is provided with a system comprising a search engine unit. The search engine unit may comprise one or more logics configured to perform the functions and operations associated with the above disclosed methods.

In another aspect of the present disclosure is provided a computer program product executable in a memory of a search engine unit.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein.

DETAILED DESCRIPTION OF EXAMPLE EMBODIMENTS

Figure 1:
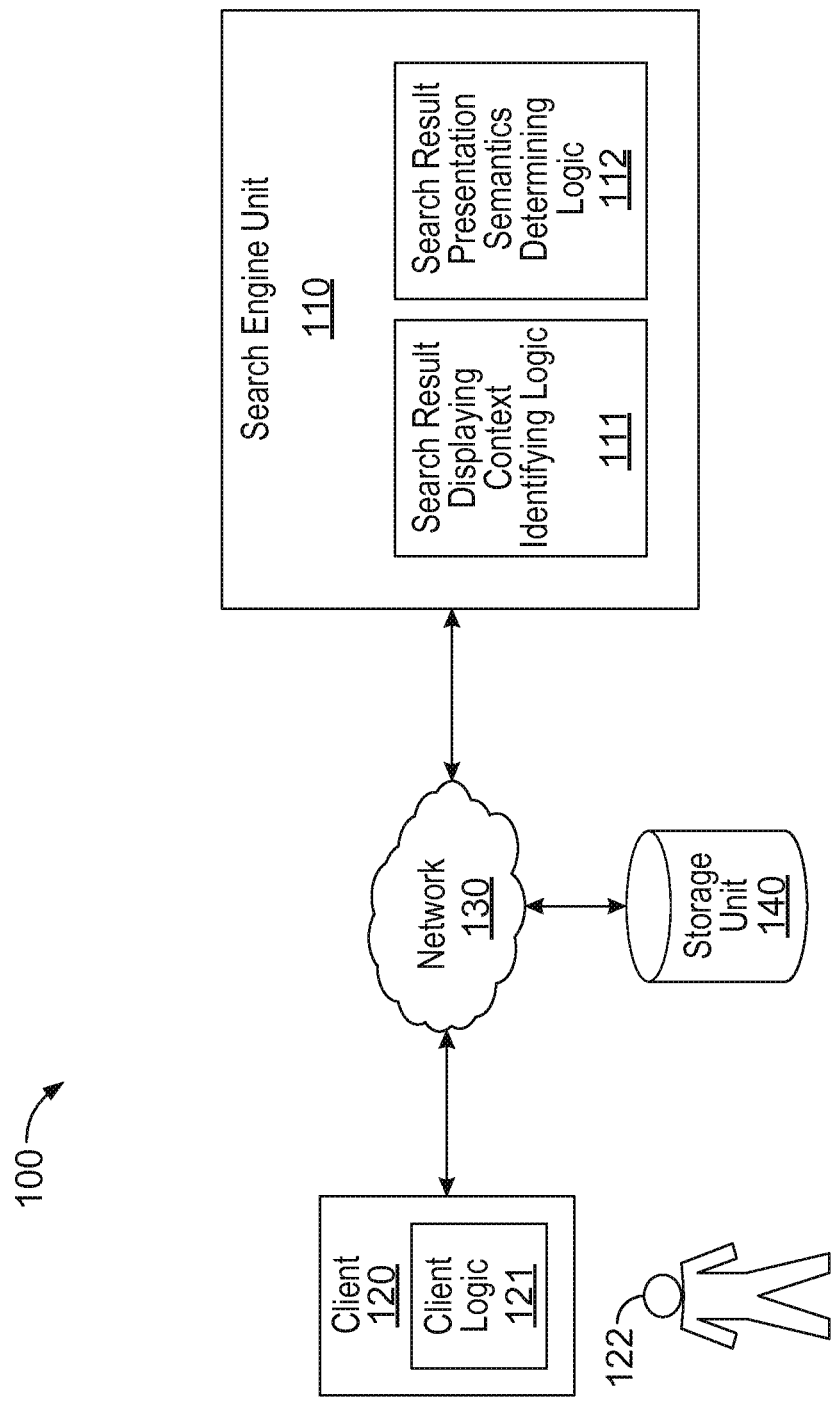
FIG. 1 is a block diagram illustrating an exemplary search environment, in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Powerpoint documents, news group postings, multimedia objects, Graphics Interchange Format images and/or Shockwave Flash files.

Through the length of the specification and claims, the words "extract" and "snippet" are used interchangeably.

The default presentation semantics in accordance with the present disclosure may refer to presentation semantics of a search extract in a corresponding document or the similar presentation semantics typically used by the search engines to display multiple search results on a search results page.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include but are not limited to a computer, handheld unit, mobile unit, consumer electronic unit, or the like.

The exemplary search engine unit 110 comprises search result displaying context identifying logic 111, and search result presentation semantics determining logic 112.

The search result displaying context identifying logic 111 may be configured to identify the context in which the search results are displayed to the user 122 by the client logic 121. The display context may include, but is not limited to, width and height of the area allocated to a search result and resolution of the display of the client 120.

The search result presentation semantics determining logic 112 may be configured to identify the width and height of the search result in default presentation semantics. In accordance with the methods of the invention, if the width or height of the search result in default presentation semantics exceeds the available width or height for the search result on the client 120, the search result presentation semantics logic 112 may alter the presentation semantics for enabling the search result to fit in the available display width and height on the client 120. For example, the search result presentation semantics logic 112 may increase or decrease the font size or change the font type while constructing the displayable format of the search result until the search result fits the display width and height.

Note that the search extract may be in various formats such as paragraph, table, list, key value pairs, question and answers, timeline and the like, without limiting the scope of the disclosure and the search result presentation semantics determining logic 112 may be configured to identify the width and height of the search extract in any of the various formats In another exemplary embodiment, the search result presentation semantics determining logic 112 may also be configured to construct the search results with variable presentation semantics for the title and/or the snippet, without limiting the scope of the disclosure.

The storage unit 140 is configured to store information associated with search results, or the like. In various embodiments, such information may include, without limitation, domains, URLs, webpages, websites, visual representations, character sets, font families, and properties of font families, information associated therewith, and the like. The storage unit 140 may be configured to be searchable for one or more of the items stored in association therewith. It will be understood and appreciated by those of ordinary skill in the art that the information stored in association with the storage unit 140 may be configurable and may include any information relevant to search results, previews, or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a prioritized list of documents containing all or some of the keyword(s) and returns the search results with suitable presentation semantics to the client logic 121 which displays the results to the user 122 in a window.

Figure 2:
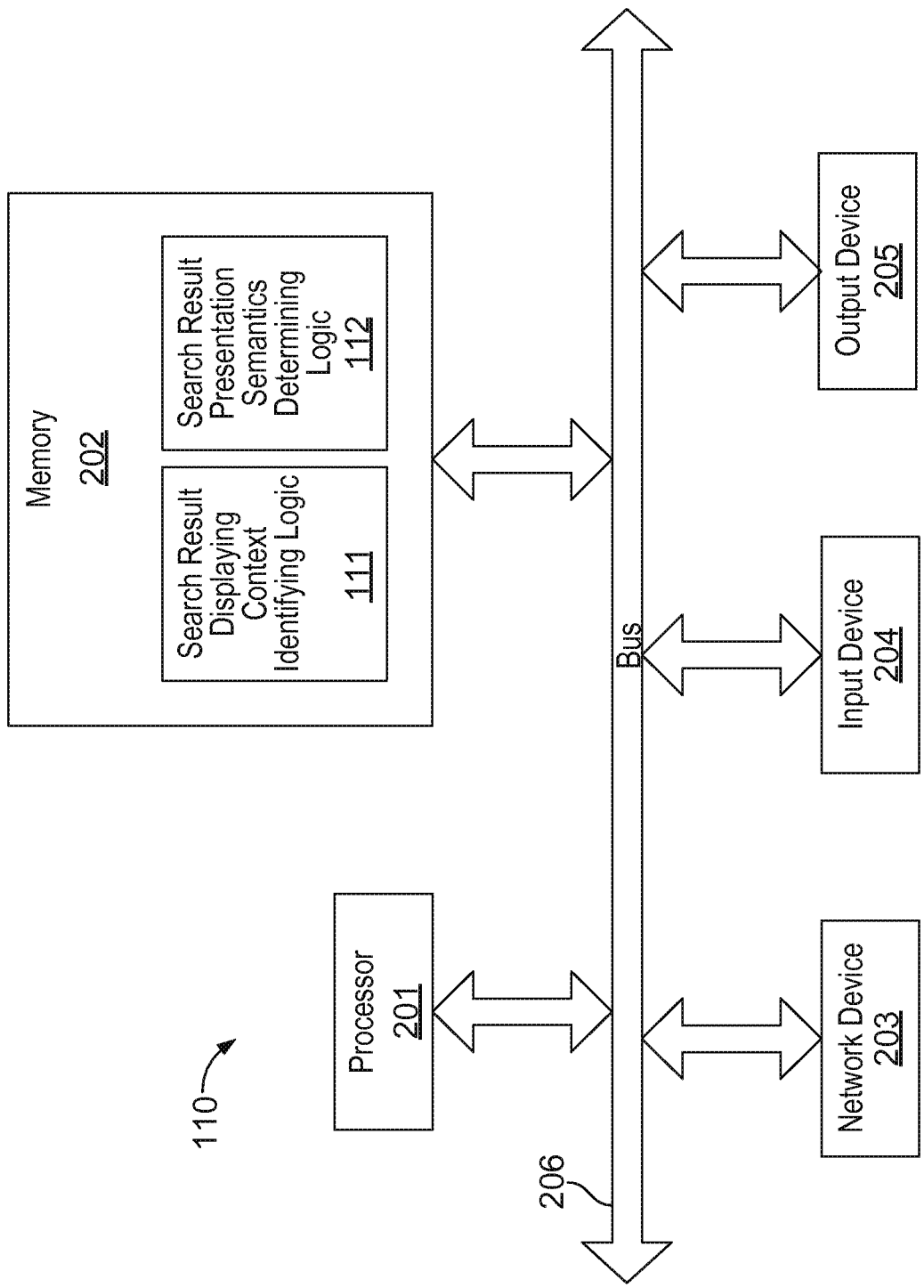
FIG. 2 is a block diagram of an exemplary computing device of FIG. 1.

In some preferred embodiments, the search engine unit 110 is shown in FIG. 2. The search engine unit 110 is only one example of a suitable computing/search environment and it is not intended to suggest any limitation as to the scope of use or functionality of the disclosure. It should be noted, however, that embodiments are not limited to implementation on such computing devices, but may be implemented on any of a variety of different types of computing units within the scope of the specification herein.

In some embodiments, the search engine unit 110 may include a bus 206, a processor 201, memory 202, network device 203, input device 204, and an output device 205. Bus 206 may include a path that permits communication among the components of the search engine unit 110.

The memory 202 stores the search result displaying context identifying logic 111, and the search result presentation semantics logic 112 as a software.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input device 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 components may be implemented by software, hardware, firmware or any combination thereof. In the exemplary search engine unit 110, depicted by FIG. 1, all the components are implemented by software and stored in memory 202.

Figure 3:
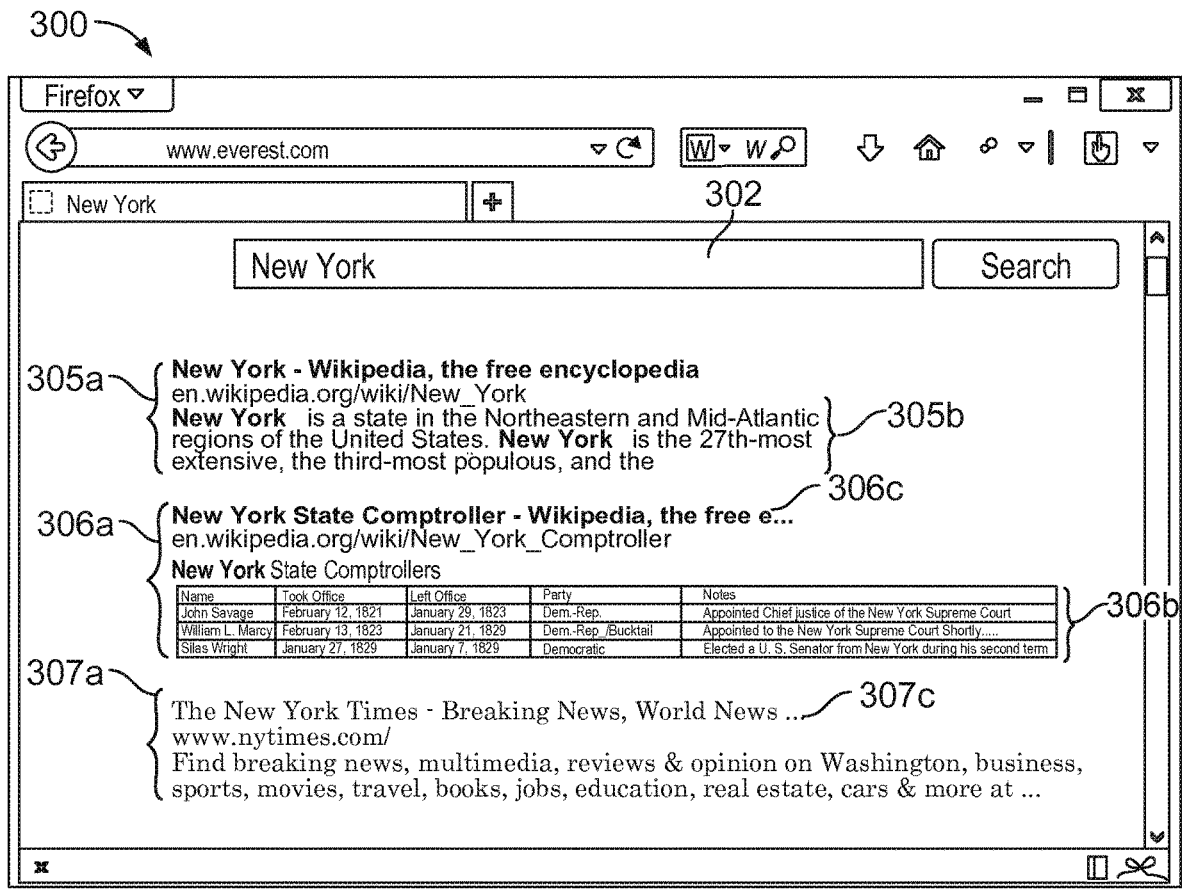
FIG. 3 illustrates search result page with variable presentation semantics of the search results.

FIG. 3 depicts a portion of the search result page 300 with variable presentation semantics of the search results, in accordance with present disclosure. When the user enters the search query 302, the search engine unit returns the search results 305a, 306a and 307a with variable presentation semantics. The snippets 305b and 306b differ in font size. For example, the snippet 305b may have "18px" as font size and the snippet 306b may have "12px" as font size. The titles 306c and 307c may have different font type. For example, the title 306c may have "Arial" as font type and the title 307c may have may have "Century" as font type. It may also be understood, that the extract 306b of the search result 306a is in table format and the width of the extract 306b exceeds the available allocated width when displayed with font size "18px"i The search result presentation semantics logic 112 (FIG. 1) may determine "12px" font size for search extract 306b by progressively reducing the default font size "18px" and comparing the width of the extract with the allocated display width. In other embodiments, instead of an iterative process, the search result presentation semantics logic 112 (FIG. 1) may determine the "12px" font size by the count of characters in each line of the extract 306b or from the scaling properties of the font type.

Figure 4:
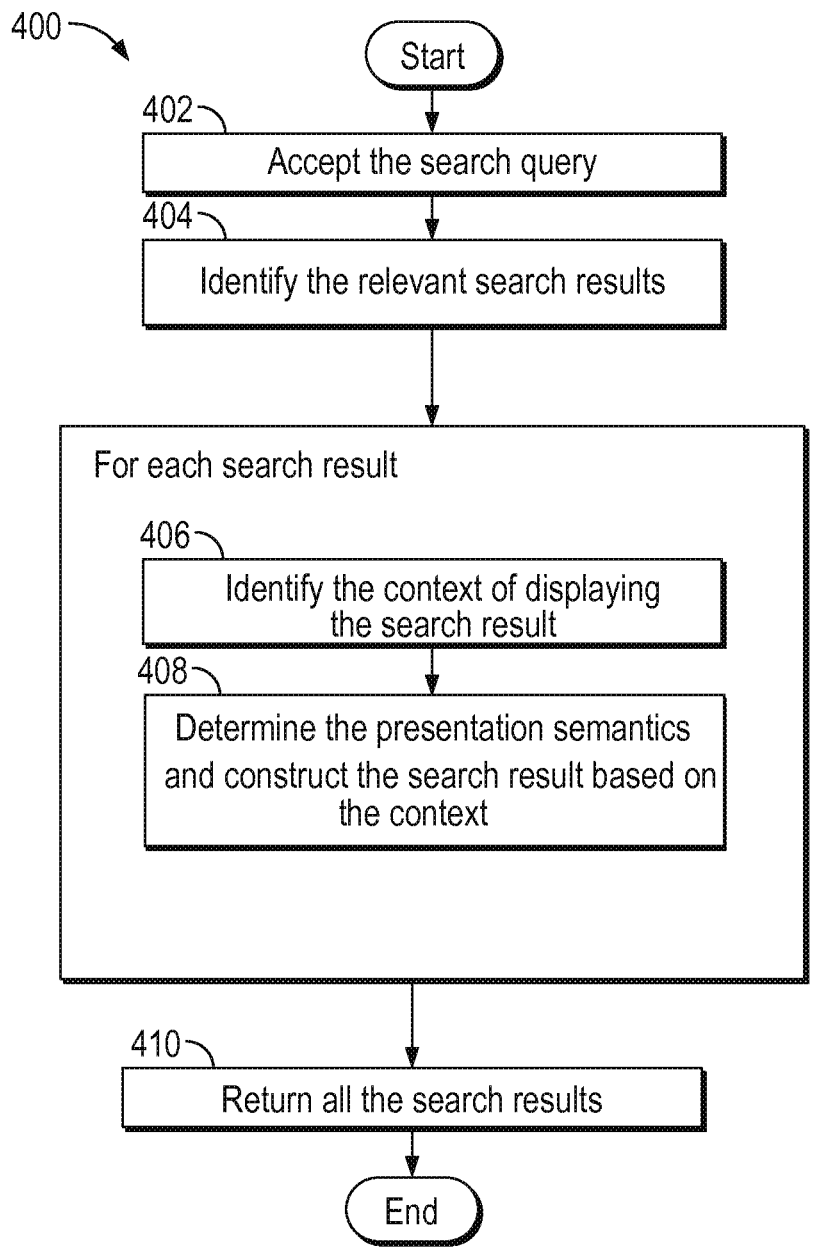
FIG. 4 is a flow diagram of a method of displaying search results with variable presentation semantics, in accordance with one or more preferred embodiments.

FIG. 4 is a flow chart illustrating one method in accordance with present disclosure. In step 402, the search engine unit 110 (FIG. 1) may accept the search query comprising the keyword(s)/search term(s). In step 404, the search engine unit 110 (FIG. 1) may find the relevant search results. For each relevant search result, step 406 and 408 may be performed by the search engine unit 110 (FIG. 1). In step 406, the search result displaying context identifying logic 111 (FIG. 1) may identify the context in which the search results are displayed to the user 122 (FIG. 1) by the client logic 121 (FIG. 1). In step 408, the search results presentation semantics logic 112 (FIG. 1) may determine the presentation semantics for the search result and construct the displayable format of the search result. In step 410, the search results with variable presentation semantics are returned.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a computing device comprising a processor, memory and a storage unit to display results of a search operation on at least one data source comprising document, said method comprising: (a) Accepting a search query comprising keyword(s) from a user; (b) Generating search results by identifying documents comprising the keyword(s) in response to the search query; (c) Constructing a search result page comprising the identified search results wherein the search result comprises of a search extract and a title; (d) For each search result, identifying a display context comprising of width and/or height of the area allocated to the search result on the search result page; (e) Determining presentation semantics of the search extract and/or title of the search result to fit in the allocated width and/or height of the search result; (f) Applying the presentation semantics to the search extract and/or title of the search result on the search result page; (g) Returning the search result page comprising the search results.

2. The method as in claim 1, wherein the presentation semantics are selected from a group comprising font size, font type and combinations thereof.

3. The method as in claim 1, wherein the presentation semantics is determined by increasing or decreasing font size.

4. The method as in claim 1, wherein the presentation semantics is determined by changing the font type.

* * * * *